United States Patent
Bi et al.

(10) Patent No.: US 7,433,335 B2
(45) Date of Patent: Oct. 7, 2008

(54) METHOD FOR SELECTING AN ACCESS CHANNEL OR A TRAFFIC CHANNEL FOR DATA TRANSMISSION

(75) Inventors: Qi Bi, Morris Plains, NJ (US); Hoo-Yin Khoe, Morris Plains, NJ (US); David Albert Rossetti, Randolph, NJ (US); Sigen Ye, Randolph, NJ (US); Qinqing Zhang, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 431 days.

(21) Appl. No.: 11/172,218

(22) Filed: Jun. 29, 2005

(65) Prior Publication Data

US 2007/0002795 A1  Jan. 4, 2007

(51) Int. Cl.
*H04Q 7/00* (2006.01)
(52) U.S. Cl. .............. 370/329; 370/310; 370/230.1; 370/232; 455/450; 455/452.2; 455/464; 455/515; 455/62
(58) Field of Classification Search .............. 370/329, 370/310, 230.1, 232; 455/450, 452.2, 464, 455/515, 62
See application file for complete search history.

(56) References Cited

U.S. PATENT DOCUMENTS

| 5,199,031 A * | 3/1993 | Dahlin | 370/329 |
| 6,754,189 B1 * | 6/2004 | Cloutier et al. | 370/329 |
| 6,775,548 B1 | 8/2004 | Rong et al. | 455/452 |
| 6,965,588 B2 * | 11/2005 | Schmidt et al. | 370/338 |
| 2002/0077110 A1 * | 6/2002 | Ishikawa et al. | 455/452 |
| 2002/0155853 A1 * | 10/2002 | Lee et al. | 455/522 |
| 2003/0045237 A1 * | 3/2003 | Gardner et al. | 455/63 |
| 2003/0076852 A1 * | 4/2003 | Fukui | 370/431 |
| 2003/0142658 A1 * | 7/2003 | Ofuji et al. | 370/349 |
| 2004/0102177 A1 * | 5/2004 | Otsuka | 455/403 |
| 2004/0235472 A1 * | 11/2004 | Fujishima et al. | 455/434 |
| 2006/0223541 A1 * | 10/2006 | Famolari | 455/450 |

FOREIGN PATENT DOCUMENTS

| EP | 1 251 663 A2 | 10/2002 |
| WO | WO 00/51245 | 8/2000 |
| WO | WO 2004/052029 | 6/2004 |

OTHER PUBLICATIONS

International PCT/US2006/024255 Search Report dated Dec. 29, 2005.

* cited by examiner

*Primary Examiner*—William Trost
*Assistant Examiner*—Huy Q Phan (57) ABSTRACT

The present invention may provide a method of communication that includes selecting at least one access channel for transmission of data based on a channel condition. The present invention may also provide a method of communication that includes receiving data over at least one access channel selected for transmission based on a channel condition.

23 Claims, 4 Drawing Sheets

METHOD FOR SELECTING AN ACCESS CHANNEL OR A TRAFFIC CHANNEL FOR DATA TRANSMISSION

BACKGROUND OF THE INVENTION

1. Field of the Invention

This invention relates generally to communication systems, and, more particularly, to wireless communication system.

2. Description of the Related Art

Conventional communication systems typically include one or more end user devices that may form communication links with one or more stations or nodes that are connected to a communication network. For example, conventional wireless communication systems include one or more base stations, which may also be referred to as node-Bs, for providing wireless connectivity to one or more access terminals (ATs), which may also be referred to using terms such as mobile units, user equipment, subscriber equipment, and mobile subscriber stations. Exemplary access terminals include cellular telephones, personal data assistants, smart phones, text messaging devices, laptop computers, desktop computers, and the like. Access terminals may also refer to modems within one or more of these devices.

Access terminals may access the communication system or network using a dedicated link or port. For example, in a wireless communication system, a mobile access terminal can establish a dedicated traffic channel with a base station. The access terminal and the base station may then exchange data via the dedicated traffic channel. For another example, in a wired communication network, a terminal or computer can access the network via a dedicated port. The access terminal may also access the communication system using a common channel or medium that is available to all access terminals that may want to access the communication system. For example, in a wireless communication system, the access channel may be a random access channel and the access terminal may send a connection request message to a base station randomly over the random access channel. Other access terminals may also be sending connection request messages using the same channel at the same frequency. For another example, in a wired local area network, terminals connected to the cables or wires may communicate with one another or with a common control system over a common channel.

In a conventional communication system, access terminals initiate communication by transmitting a probe containing connection request message over an access channel. After a few message exchanges between the access terminal and the network, a dedicated traffic channel may then be set up in response to the connection request and the dedicated traffic channel may be used for subsequent data transmissions. For example, the radio spectrum of a wireless communication system is a scarce resource and so traffic channels are not typically allocated until a base station receives a probe, such as a connection request message, from an access terminal. Accordingly, when an access terminal is idle (e.g., the access terminal does not have an active traffic channel connection to a base station) and wants to establish a traffic channel to transmit data traffic, the access terminal sends connection request messages via the random access channel. Once the connection request messages are received successfully by the system, a dedicated traffic channel is established between the access terminal and the network and the access terminal starts sending the data traffic over the traffic channel. When the access terminal has finished sending data, the dedicated traffic channel may be torn down to conserve radio resources, which may be used by other access terminals.

An idle access terminal may also choose to send a short burst of data traffic over the random access channel. The access terminal may be able to transmit the short burst without going through the traffic channel setup procedure. Consequently, transmitting data over the access channel can potentially reduce the delay by avoiding the time for connection setup. Access channel transmission may be especially attractive for delay sensitive applications such as push-to-talk call setup messages. However, sending data over the access channel also has some drawbacks. For example, access channel collisions between concurrent data transmissions from multiple access terminals may cause some or all or the concurrent data transmissions to fail. For another example, transmission over access channels is usually less spectrally efficient than transmission over traffic channels, particularly in a wireless communication system. In a CDMA system, an access channel's transmission efficiency is worse than that of the traffic channel because of lack of closed loop power control and soft handoff. In general, the successful rate of data transmission over the access channel is smaller than the successful rate of data transmission over the traffic channel.

Conventional access terminals decide whether or not to use the access channel to transmit data based on the amount of data to be sent. For example, the access terminal may use a parameter, AccessPayloadMax, which indicates a threshold value for the size of the data block. For example, the parameter, AccessPayloadMax, may be set to 200 bytes. If the number of bytes in a data burst is less than the number of bytes indicated by the parameter, AccessPayloadMax, then the data burst can be transmitted over the access channel. However, if the number of bytes in a data burst is greater than the number of bytes indicated by the parameter, AccessPayloadMax, then the data burst must be transmitted over a traffic channel. Consequently, the access terminal may need to transmit a connection request message or probe over the access channel and a traffic channel may need to be set up to carry the data burst.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for selecting at least one access channel for transmission of data based on a channel condition. In one alternative embodiment of the present invention, a method is provided for receiving data over at least one access channel selected for transmission based on a channel condition.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
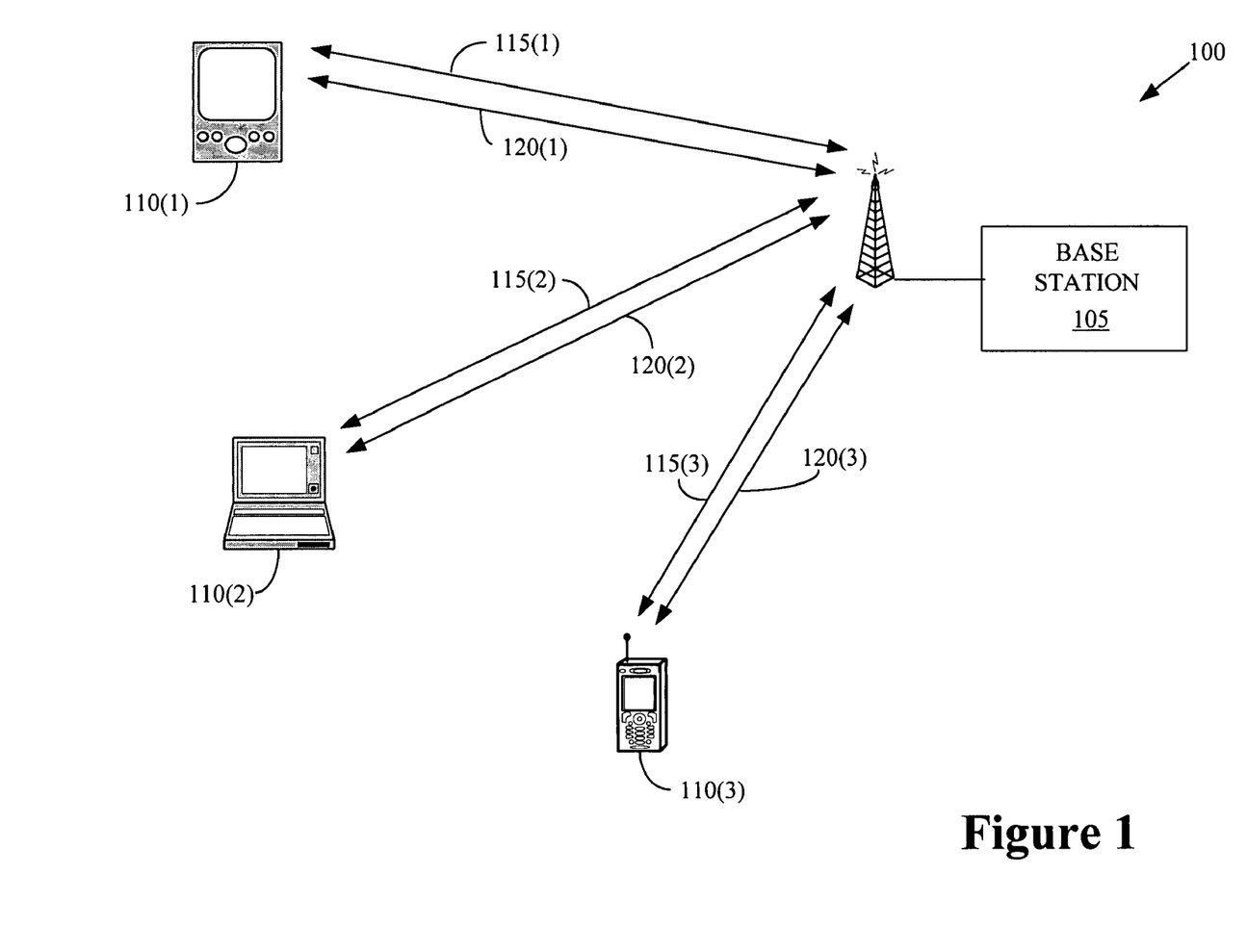
FIG. 1 conceptually illustrates one exemplary embodiment of the communication system, in accordance with the present invention.

FIG. 1 conceptually illustrates one exemplary embodiment of the communication system 100. In the illustrated embodiment, the communication system 100 is a wireless communication system 100. However, persons of ordinary skill in the art having benefit of the present disclosure should appreciate that the present invention is not limited to wireless communication systems. In alternative embodiments, the communication system 100 may be wired communication system or a communication system including wired and wireless portions. Accordingly, the communication system 100 may operate according to one or more wireless communication protocols, one or more wired communication protocols, or a combination of wired and wireless communication protocols.

The communication system 100 includes a base station 105 that provides wireless connectivity to one or more access terminals 110(1-3). Hereinafter, in the interest of clarity, the access terminal indices (1-3) will be dropped when the access terminals 110 are referred to collectively. The indices (1-3) will only be used to refer to individual access terminals 110. In the illustrated embodiment, the access terminal 110(1) is a personal data assistant, the access terminal 110(2) is a laptop computer, and the access terminal 110(3) is a mobile phone. However, persons of ordinary skill in the art having benefit of the present disclosure should appreciate that the access terminals 110 are not limited to personal data assistants, laptop computers, or mobile phones. In alternative embodiments, the access terminals 110 may be any end-user device including, but not limited to, smart phones, text messaging devices, desktop computers, and the like. Furthermore, the term "access terminal" may also be used to refer to the portion of an end-user device that communicates with the communication system 100. For example, a modem in the laptop computer 110(2) may be referred to as an access terminal. Persons of ordinary skill in the art should also appreciate that the present invention is not limited to a single base station 105 and in alternative embodiments the communication system 100 may include any number of base stations 105.

In operation, the access terminals 110 may form one or more wireless communication links with the base station 105. The wireless communication links may include one or more channels such as access channels 115(1-3) and/or traffic channels 120(1-3). In the illustrated embodiment, the access terminal 110(1) may establish the access channel 115(1) and/or the traffic channel 120(1) with the base station 105, the access terminal 110(2) may establish the access channel 115(2) and/or the traffic channel 120(2) with the base station 105, and the access terminal 110(3) may establish the access channel 115(3) and/or the traffic channel 120(3) with the base station 105. Hereinafter, in the interest of clarity, the channel indices (1-3) will be dropped when the channels 115, 120 are referred to collectively. Although the access channels 115 are depicted in FIG. 1 as separate channels associated with individual access terminals 110, persons of ordinary skill in the art having benefit of the present disclosure should appreciate that, in some embodiments, the access channels 115 may be a common channel available to the access terminals 110, as well as any other devices that may communicate with the base station 105. For example, the access channels 115 may be a common random access channel.

The access terminals 110 and the base station 105 may exchange information including signaling messages. As used hereinafter, the term "signaling messages" will be used to refer to information that may be used to configure portions of the access terminals 110 and/or the base station 105, establish one or more channels, maintain one or more channels, tear down one or more channels, and/or perform other such tasks. For example, signaling messages may include connection request messages, location update messages, broadcast messages, and the like. Signaling messages may also be used to synchronize the access terminals 110 and the base station 105.

The access terminals 110 and the base station 105 may also exchange information including data. As used hereinafter, the term "data" will be used to refer to information provided by one or more user applications associated with the access terminals 110 and/or the base station 105. For example, voice applications (e.g., Voice over IP applications) associated with the mobile phone 110(3) may provide delay sensitive information such as voice data and may receive voice data from the base station 105. For another example, user applications associated with the personal data assistant 110(1) and/or the laptop computer 110(2) may provide data such as non-delay sensitive information to the communication system 100 and may receive data from the base station 105. Data may also be referred to as bearer traffic, in accordance with common usage in the art.

Signaling messages are typically sent over the access channels 115 and data is typically sent over the traffic channels 120. However, data may be transmitted over one or more of the access channels 115. For example, if a channel condition associated with an access channel 115 and/or a traffic channel 120 is relatively good, an access terminal 110 may select a relatively high transmission rate for information transmitted over the access channel 115. If the amount of data to be sent is relatively small, then the access terminal 110 may choose to transmit the data over the access channel 115, which may reduce the overhead associated with establishing and/or tearing down a traffic channel 120. Accordingly, one or more of the access channels 115 may be selected to transmit data based on a channel condition. The channel condition may reflect attenuation patterns from the perspective of the access terminal 110 and/or the base station 105, and may be derived from channel quality information signals corresponding to a signal-to-noise ratio and/or a signal-to-interference ratio.

Figure 2:
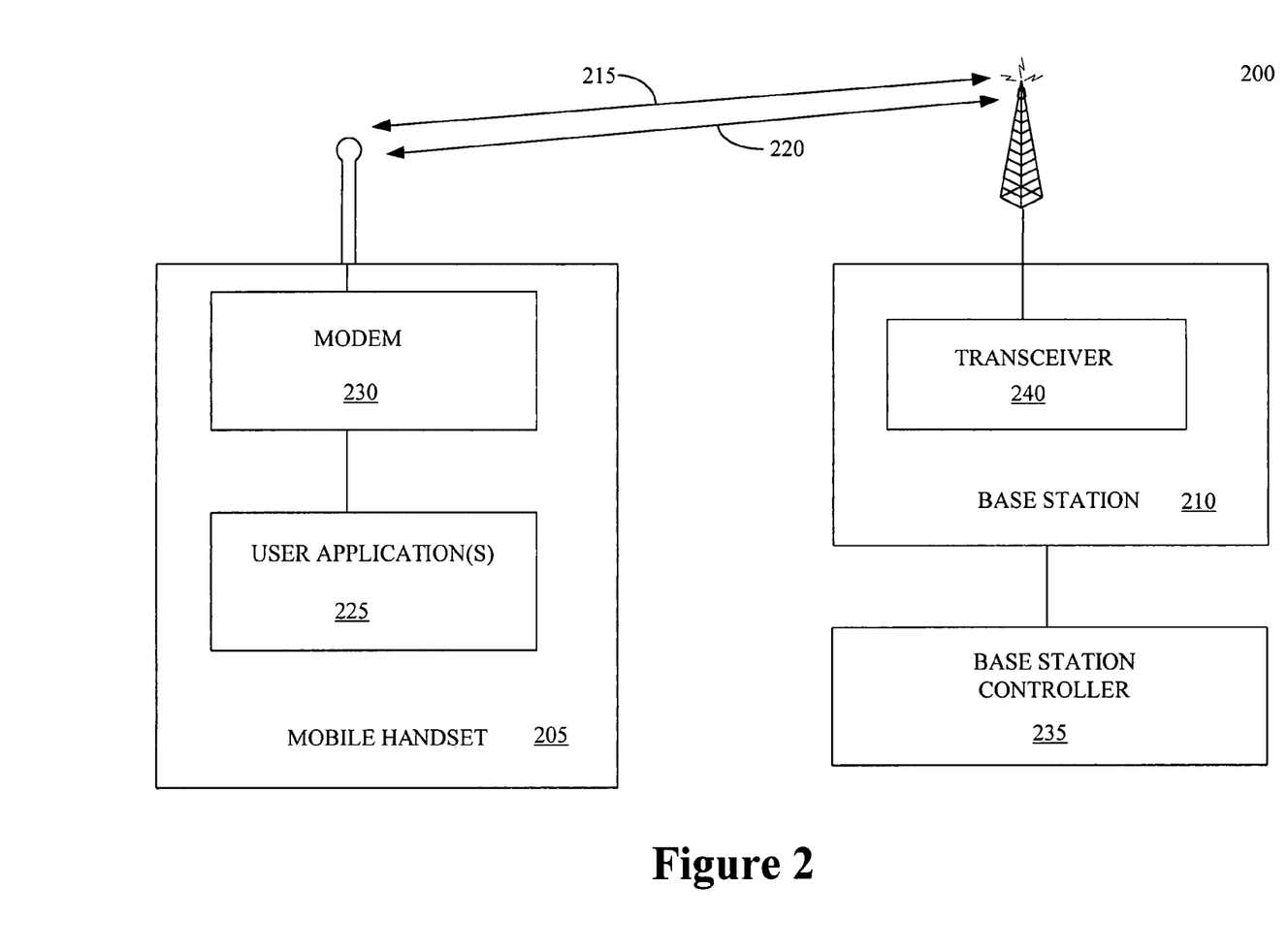
FIG. 2 conceptually illustrates one exemplary embodiment of a communication system in which a mobile handset communicates with a base station, in accordance with the present invention.

FIG. 2 conceptually illustrates one exemplary embodiment of a communication system 200 in which a mobile handset 205 communicates with a base station 210. In the illustrated embodiment, the mobile handset 205 communicates with the base station 210 over a wireless communication link that may include an access channel 215 and/or a traffic channel 220. The mobile handset 205 includes one or more user applications 225, such as a VoIP application, a text messaging application, a Web browser, and the like. As discussed above, the user application 225 may provide data to, or receive data from, an access terminal such as a modem 230. The modem 230 may transmit and receive signaling messages and/or data over the access channel 215 and/or the traffic channel 220.

The modem 230 may select a data transmission rate for transmitting data over the access channel 215 and/or the traffic channel 220. In general, better channel conditions permit the modem 230 to select higher transmission rates. For example, Third Generation (3G) wireless communication systems, such as the CDMA2000 EV-DO (Evolution-Data Only) Revision A system, define three transmission rates for the access channel 215 on the reverse link, i.e., 9.6 kbps, 19.2 kbps, and 38.4 kbps. A 3G-compatible modem 230 may select the transmission rate based on an available power resource and an amount of the data scheduled for transmission. Higher rate transmissions typically need more power than lower rate transmissions. Since the power budget of the modem 230 may be limited, higher rate transmissions may be limited to mobile handsets 205 that have relatively good channel conditions. For example, if the mobile handset 205 is in a location close to the base station and the channel conditions are relatively good, the modem 230 can choose to send the data at higher rate, such as 38.4 kbps.

If the mobile handset 205 is in a poor geometry location and suffers from poor channel conditions for this or some other reason, the modem 230 may not have enough power to transmit data at the higher rate. The modem 230 may therefore select a lower data transmission rate, such as 9.6 kbps. In one embodiment, the modem 230 may select the higher transmission rate only when it has enough data to fill in the transmission frame, which is larger than the frame size of lower transmission rate. On the other hand, if the modem 230 selects to transmit at a lower rate and has more data than can be transmitted in a single frame, multiple frames can be generated and multiplexed together to be sent out in one access attempt.

The modem 230 may select the access channel 215 for transmitting data based on a channel condition when the traffic channel 220 is not present. In one embodiment, the modem 230 may select the access channel 215 based on a data transmission rate that is determined, at least in part, using the channel condition, as discussed above. For example, the modem 230 may compare the determined data transmission rate to one or more threshold data transmission rates. If the determined data transmission rate is larger than the one or more threshold data transmission rates, the modem 230 may select the access channel 215 for data transmission. However, if the determined data transmission rate is smaller than one or more of the threshold data transmission rates, the modem 230 may apply one or more additional criteria to select between transmitting data over the access channel 215 and a traffic channel 220, or the modem 230 may select the traffic channel 220 for data transmission. In one embodiment, data may be multiplexed with signaling information and the multiplexed messages may be transmitted over the access channel 215.

The modem 230 may alternatively select the access channel 215 for data transmission based on other parameters that are determined, at least in part, using the channel condition. In one embodiment, a base station controller 235 may determine one or more values of a parameter, AccessPayloadMax. The values of the parameter, AccessPayloadMax, may be dependent on the power availability at the mobile handset 205, which may depend, at least in part, on the channel condition. For example, the controller 235 may select a relatively large value of the parameter (e.g., AccessPayloadMax=200 bytes) when the channel conditions are good and a relatively low value of the parameter (e.g., AccessPayloadMax=100 bytes) when the channel conditions are poor. The values of the parameter, AccessPayloadMax, may then be broadcasted to the mobile handsets including mobile handset 205 using a transceiver 240 and the modem 230 may use the values of the parameter, AccessPayloadMax, to determine whether or not to transmit data over the access channel 215. For example, if the amount of data scheduled to be sent is less than the value of the parameter, AccessPayloadMax, the modem 230 may select the access channel 215 for data transmission. The modem 230 may select the traffic channel 220 for data transmission when the amount of data scheduled to be sent is larger than the value of the parameter, AccessPayloadMax. If the modem 230 has to reduce the transmitted data rate because of power availability, or the modem 230 reaches a maximum transmit power at 9.6 kbps, a different (smaller) value of the parameter, AccessPayloadMax, may be used by the modem 230 to determine the payload size.

In another embodiment, the AccessPayloadMax parameter can be configured as the number of frames in an access capsule, instead of number of bits/bytes. A base station controller 235 may determine the value of AccessPayloadMax. The actual access payload size in terms of number of bytes may be dependent on the transmission rate of the access channel. For example, if AccessPayloadMax is configured to have a size of 4 frames and the mobile handset 205 selects a 9.6 kbps transmission rate, the mobile handset 205 may only send about 115 bytes of payload in each access attempt. On the other hand, if the mobile handset 205 selects a 38.4 kbps transmission rate, it may be able to send as much as 460 bytes of payload. The transmission rate selected by the mobile handset 205 may also (or alternatively) depend on the channel condition. The values of the parameter, AccessPayloadMax, may then be broadcast to the mobile handsets including mobile handset 205 using the transceiver 240. The modem 230 may then use the values of the parameter, AccessPayloadMax, to determine whether or not to transmit data over the access channel 215. For example, if the amount of data scheduled to be sent can be transmitted in fewer frames than indicated by the value of the parameter, AccessPayloadMax, for a selected transmission rate, the modem 230 may select the access channel 215 for data transmission. The modem 230 may select the traffic channel 220 for data transmission when the amount of data scheduled to be sent can not be fit in the number of frames indicated by the value of the parameter, AccessPayloadMax.

Figure 3:
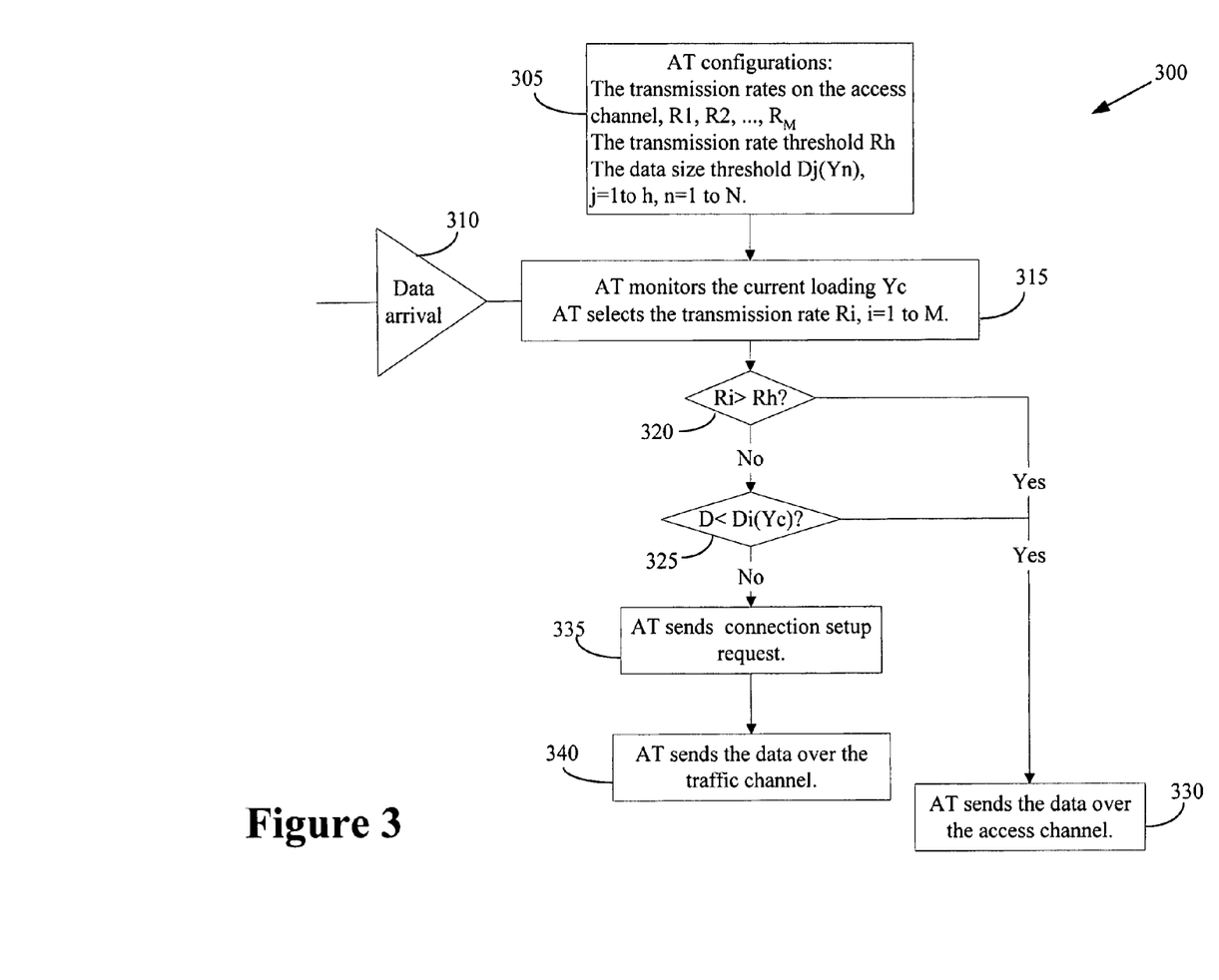
FIG. 3 conceptually illustrates one exemplary embodiment of a method for selecting an access channel to transmit data, in accordance with the present invention.

FIG. 3 conceptually illustrates one exemplary embodiment of a method 300 for selecting an access channel to transmit data. In the illustrated embodiment, an access terminal (AT), such as the access terminals 110 shown in FIG. 1, is configured (at 305). Configuring (at 305) the access terminal may include determining the access channel transmission rates, determining one or more transmission rate thresholds, and/or determining one or more data size thresholds. For example, the access terminal may be configured (at 305) to select from one of M transmission rates, $R1<R2<\ldots<R_M$, for the access channel. The transmission rate threshold, Rh, and the data size threshold, Di, may be determined by the system and broadcast to all the access terminals in the system. In some embodiments, the data size threshold, Di, may have multiple values if there are multiple transmission rates smaller or equal to Rh. The data size threshold, Di, can be set differently based on the current loading of the system, e.g., Di(Y), where Y is the loading or the amount of traffic the system is supporting on the reverse link. In the illustrated embodiment, the access terminal monitors the loading condition in the system so that it can choose the appropriate threshold Di. The loading Y may affect the success probability of the access probes as noted by the access terminal. In various alternative embodiments, the loading Y can be the total amount of traffic in an interference limited system (e.g., a CDMA system) or the loading in the access channel only (e.g., in a wireline access system).

When data arrives (at 310) for transmission, the access terminal selects (at 315) a data transmission rate. For example, the access terminal may have been configured (at 305) to utilize one of three transmission rates, R1=9.6, R2=19.2, and R3=38.4 kbps. The access terminal may then select (at 315) a data transmission rate from the set of three data transmission rates. For example, if the access channel condition is relatively good, the access terminal may select (at 315) a data transmission rate of R3=38.4 kbps. For another example, if the access channel condition is relatively poor, the access terminal may select (at 315) a data transmission rate of R1=9.6.

The access terminal may then compare (at 320) the selected data transmission rate to the data transmission rates threshold Rh. The access terminal may also compare (at 325) the amount of data that is to be sent with the data size threshold Di. If the access terminal selects (at 315) a higher transmission rate, for example, Ri, and Ri>Rh, h,i∈{1,M}, where Rh is the selection threshold for a transmission rate, then the access terminal may transmit (at 330) the data over the access channel. If the access terminal selects (at 315) a transmission rate Ri, which is lower or equal to Rh, then the access terminal compares (at 325) the amount of data D to a threshold, Di, which is associated with the transmission rate Ri. If D<Di, the access terminal may transmit (at 330) the data over the access channel. Otherwise, the access terminal may transmit (at 335) a connection request to establish the traffic channel. Once the traffic channel has been established, the access terminal may transmit (at 340) the data over the traffic channel.

For example, the transmission rate threshold Rh may be set at R1 and the data size threshold, D1(Y), may be configured (at 305) to values of D1(Y=Y1∈{0.72, 1})=100 bytes and D1(Y=Y2∈{0.5, 0.72})=150 bytes for the loadings Y1 and Y2. If the access terminal selects (at 315) a rate higher than R1, the access terminal may transmit (at 330) the data over the access channel. If the access terminal selects (at 315) the data transmission rate R1 and the current loading is high, Y=0.8, the access terminal may transmit (at 330) the data over the access channel if the comparison (at 325) indicates that the data size is less than 100 bytes. Otherwise, if the comparison (at 325) indicates that the data size is larger than 100 bytes, the access terminal may transmit (at 335) a connection request to establish the traffic channel and transmit (at 340) the data over the traffic channel.

The method 300 may have number of advantages over conventional practice. For example, when the access terminal selects a higher transmission rate, this may indicate that the access terminal is in a good geometric location relative to the base station and has enough power to transmit at a higher rate. Thus, the access terminal may be able to achieve a relatively high success rate when it transmits data over the access channel. The transmission delay associated with transmitting the data over the access channel may be much shorter than the corresponding delay associated with sending data over the traffic channel, at least in part because sending data over a traffic channel generally requires performing a connection setup procedure. On the other hand, when the access terminal selects a lower transmission rate and/or the data size is large, this may indicate that the access terminal is in a poor geometric location relative to the base station and therefore the access terminal may not have enough power to transmit at a higher rate. In that case, the access terminal may have to send the data in multiple frames at a lower rate. The transmission of multiple frames often results higher failure rate of the access probe, because if any one of the frames fails, the access probe will fail. Probe failure may result in more retransmission and thus increase the delay, which may diminish the advantage of sending data over the access channel. In this case, it may be desirable to send the data over the more reliable traffic channel. In some cases, the delay associated with transmitting the data over the traffic channel may be even smaller than the delay associated with transmitting the data over the access channel because of the large number of retransmissions that may be required to transmit the data over the access channel. Another advantage is that this method may increase the coverage percentage of mobile users in a CDMA communication system.

Figure 4:
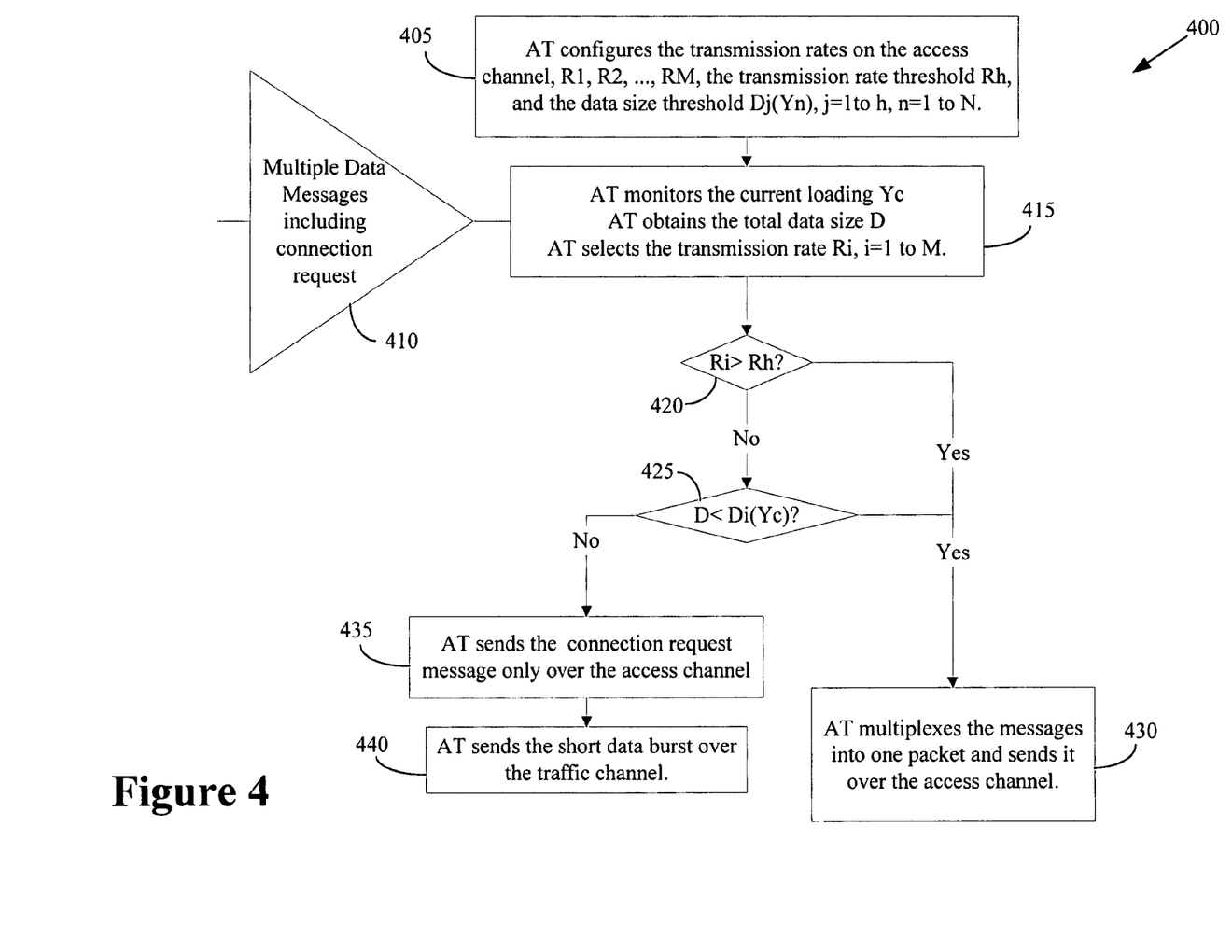
FIG. 4 conceptually illustrates one exemplary embodiment of a method for multiplexing data and signaling messages for transmission on an access channel, in accordance with the present invention.

FIG. 4 conceptually illustrates one exemplary embodiment of a method 400 for multiplexing data and signaling messages for transmission on an access channel. As discussed above, an access terminal (AT), such as the access terminals 110 shown in FIG. 1, is configured (at 405). Configuring (at 405) the access terminal may include determining the access channel transmission rates, determining one or more transmission rate thresholds, and/or determining one or more data size thresholds. Multiple messages arrive (at 410) for transmission. In the illustrated embodiment, the messages include data and at least one signaling message, such as a connection request message. When the access terminal has different types of messages to transmit, the access terminal may multiplex the data and signaling messages together into one or more access packets for transmission.

As discussed above, the access terminal may select (at 415) a transmission rate. The access terminal may also monitor the current loading of the system and obtain the total size of the data that is to be transmitted. The access terminal may then compare (at 420) the selected data transmission rate to the data transmission rates threshold Rh. The access terminal may also compare (at 425) the amount of data that is to be sent with the data size threshold Di. If the access terminal selects (at 415) a higher transmission rate, for example, Ri, and Ri>Rh, h,i∈{1,M}, then the access terminal may multiplex (at 430) the data and connection request messages and transmit the multiplexed information over the access channel.

If the access terminal selects (at 415) a transmission rate Ri that is less than or equal to the transmission rate threshold Rh, then the AT compares (at 425) the amount of data D (e.g., the amount of data in the combined data and other messages) to a threshold, Di, which is associated with the transmission rate Ri. If D<Di, the access terminal may multiplex (at 430) the data messages together into one access packet and send it over the access channel. Otherwise, the access terminal may not do any multiplexing of the messages. Instead, the access terminal may transmit (at 435) the connection request message over the access channel. After a traffic channel is set up, the access terminal may transmit (at 440) the data over the traffic channel.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of communication in a system that supports at least one traffic channel for carrying data provided by at least one user application and at least one access channel for carrying signaling messages, comprising:
   selecting a data transmission rate based on at least one channel condition of said at least one access channel; and
   transmitting data over said at least one access channel instead of transmitting the data over said at least one traffic channel when the selected data transmission rate exceeds a threshold data transmission rate, a portion of the data being provided by the user application.

2. The method of claim 1, comprising comparing an amount of the data to be sent to at least one threshold data amount when the selected data transmission rate is below the threshold data transmission rate.

3. The method of claim 2, comprising transmitting data provided by the user application over said at least one access channel instead of transmitting the data over said at least one traffic channel when the amount of the data to be sent is less than said at least one threshold data amount and when the selected data transmission rate is below the threshold data transmission rate.

4. The method of claim 3, comprising transmitting data provided by the user application over said at least one traffic channel when the amount of the data to be sent is larger than said at least one threshold data amount and when the selected data transmission rate is below the threshold data transmission rate.

5. The method of claim 1, comprising forming said portion of data by multiplexing at least two data messages.

6. The method of claim 5, wherein multiplexing said at least two data messages comprises multiplexing a connection request message and a data message.

7. The method of claim 1, comprising:
   receiving at least one parameter determined based upon at least one channel condition, said at least one parameter comprising the threshold data transmission rate or said at least one threshold data amount.

8. The method of claim 7, wherein receiving said at least one parameter comprises receiving at least one parameter determined based upon at least one power availability.

9. The method of claim 7, wherein receiving said at least one parameter comprises receiving first and second parameters, the first parameter being associated with a relatively good channel condition and the second parameter being associated with a relatively bad channel condition.

10. The method of claim 7, wherein receiving said at least one parameter comprises receiving at least one parameter indicative of a number of frames.

11. A method of communication in a system that supports at least one traffic channel for carrying data provided by at least one user application and at least one access channel for carrying signaling messages, comprising:
    receiving data over said at least one access channel instead of receiving the data over said at least one traffic channel when a selected data transmission rate exceeds a threshold data transmission rate, a portion of the data being provided by the user application.

12. The method of claim 11, wherein receiving said data comprises receiving said data over at least one access channel selected for transmission based on at least one of a data transmission rate and a data size.

13. The method of claim 12, comprising determining at least one of a threshold transmission rate and a threshold size.

14. The method of claim 13, comprising providing at least one of the threshold transmission rate and the threshold size.

15. The method of claim 14, wherein receiving said data comprises receiving said data over at least one access channel selected for transmission based on a comparison of at least one of the data transmission rate and the data size with at least one of the threshold transmission rate and the threshold size.

16. The method of claim 11, wherein receiving said data comprises receiving data formed by multiplexing at least two data messages.

17. The method of claim 16, wherein receiving said data comprises receiving data formed by multiplexing a connection request message and a data message.

18. The method of claim 11, comprising:
 determining at least one parameter based upon at least one channel condition; and
 providing said at least one parameter.

19. The method of claim 18, wherein receiving said data comprises receiving data over at least one access channel selected for transmission based upon said at least one parameter.

20. The method of claim 18, wherein determining said at least one parameter comprises determining at least one parameter determined based upon at least one power availability.

21. The method of claim 20, wherein determining said at least one parameter comprises determining first and second parameters, the first parameter being associated with a relatively good channel condition and the second parameter being associated with a relatively bad channel condition.

22. The method of claim 18, wherein determining said at least one parameter comprises determining at least one parameter indicative of a number of frames.

23. The method of claim 11, wherein receiving said data over said at least one access channel selected for transmission based on the channel condition comprises receiving data over at least one access channel selected for transmission based on a channel condition associated with at least one of a traffic channel and said at least one access channel.

* * * * *